United States Patent [19]

Van Gompel

[11] 4,010,788

[45] Mar. 8, 1977

[54] BOLT SEAL

[75] Inventor: James J. Van Gompel, Fremont, Ind.

[73] Assignee: Brammall, Inc., Angola, Ind.

[22] Filed: Sept. 29, 1975

[21] Appl. No.: 617,597

[52] U.S. Cl. .................. 151/2 A; 85/1 P; 151/13; 292/327

[51] Int. Cl.² ...................... F16B 39/02

[58] Field of Search ............... 151/2 A, 2 R, 21 C, 151/13, 27; 292/284, 327, 286, 307 R; 85/31, 61, 72, 1 P; 81/1 R; 140/123; 72/458; 70/1.5, 422

[56] References Cited

UNITED STATES PATENTS

| 414,708 | 11/1889 | Ives | 151/29 |
|---|---|---|---|
| 748,009 | 12/1903 | Ramsey | 151/2 A |
| 1,387,258 | 8/1921 | Gunnett et al. | 151/2 A |
| 1,575,418 | 3/1926 | Dietze | 292/327 X |
| 1,935,681 | 11/1933 | Washburn | 292/327 |
| 2,123,764 | 7/1938 | Berry | 292/327 X |
| 2,247,981 | 7/1941 | Washer | 151/36 X |
| 2,784,622 | 3/1957 | Curtin | 72/458 |
| 2,892,226 | 6/1959 | Bradney | 85/61 X |
| 3,597,949 | 8/1971 | Nigrelli | 70/1.5 X |
| 3,862,775 | 1/1975 | Gudmundsen | 292/327 |

FOREIGN PATENTS OR APPLICATIONS

| 710,653 | 8/1931 | France | 85/31 |
|---|---|---|---|
| 1,186,067 | 8/1959 | France | 151/2 R |

OTHER PUBLICATIONS

Bolts are Important, The Lamson and Sessions Company, copyright 1944, pp. 6–7.

Primary Examiner—Roy D. Frazier
Assistant Examiner—Rodney H. Bonck
Attorney, Agent, or Firm—Hill, Gross, Simpson, Van Santen, Steadman, Chiara & Simpson

[57] ABSTRACT

A bolt seal for securing hasps on trailer truck doors and/or rail car doors which utilizes a round or oval head bolt which extends through the hasps and upon which a nut is threaded. The nut is threaded onto the bolt until it is tight and then a hollow tube is used to bend the bolt sharply to about 90° just under the nut. Identification number areas are formed at the tail of the bolt and on a flat portion of the bolt adjacent the head. If a thief tries to break the seal by bending the bolt back to its original straight condition, the metallurgy of the bolt is selected so that the bolt breaks off. This indicates that the seal has been tampered with and furthermore, the thief finds that if he tries to turn the nut the round head of the bolt will rotate and since the threads are upset by the bending he will be unable to remove the nut. A modification of the invention utilizes a spin nut which is cylindrical in shape.

4 Claims, 7 Drawing Figures

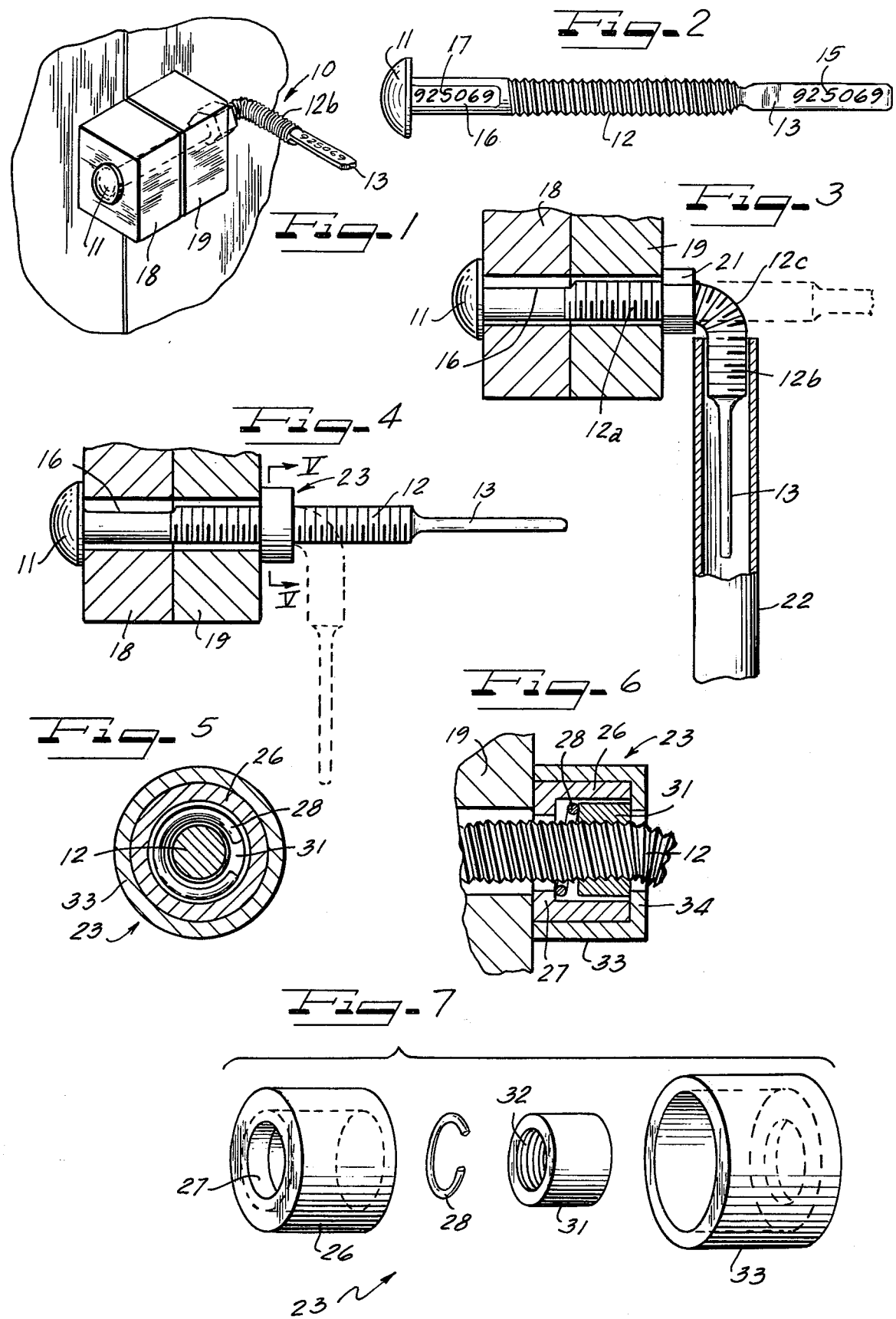

BOLT SEAL

BACKGROUND OF THE INVENTION

1. Field of the Invention

This invention relates in general to security devices and in particular to a novel bolt seal.

2. Description of the Prior Art

Bolts and nuts have been used to secure trailer truck or rail car doors, however, thieves have easily removed a nut from the bolt to steal the merchandise from the truck or rail car and then often times replace the bolt so that the theft will go undetected for long periods of time.

SUMMARY OF THE INVENTION

The present invention relates to a bolt seal comprising a round headed bolt receivable through the hasps of trailer truck or rail car doors and upon which a nut is threaded to secure the bolt. The bolt is bent to approximately 90° adjacent the nut by a bending tool. An identification number area is formed on the end of the bolt as well as on a flat portion adjacent the head of the bolt such that if a thief tampers with the bolt and attempts to straighten it the bolt will break, thus, indicating at the cargo receiving point that the seal has been tampered with. In one embodiment a nut is used on the bolt and in a second embodiment a spin nut is used which has an outer cylindrical shell and an inner threaded cylindrical portion which can be threaded onto the bolt until its tightened but which cannot be easily removed by turning the outer cylindrical shell since the outer cylindrical shell can rotate relative to the threaded portion.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which

BRIEF DESCRIPTION OF THE DRAWINGS

FIG. 1 is a perspective view of the bolt seal of the invention;

FIG. 2 illustrates the bolt;

FIG. 3 is a sectional view of the bolt seal;

FIG. 4 illustrates a modification of the invention;

FIG. 5 is a sectional view on line V—V from FIG. 4;

FIG. 6 is a sectional view of the spin nut and bolt, and

FIG. 7 is an exploded view of the spin nut.

DESCRIPTION OF THE PREFERRED EMBODIMENTS

FIG. 1 illustrates a pair of hasps 18 and 19 which are mounted on doors that are to be sealed and the bolt seal 10 of the invention extends through openings formed in the hasps 18 and 19. The bolt has a head 11 and a threaded portion 12 and a first identification area 13 which extends from the end of the threaded portion 12 away from the head 11. The area adjacent the head is flattened to form a second identification area 16. Seal identification numbers 15 and 17 are formed on the identification areas 13 and 16.

In use the bolt is inserted through the openings of the hasps 18 and 19 and a nut 21 is threaded on the bolt 12 until it is tight. Then a bending tool 22 which can be a hollow tube is placed over the end of the bolt 12 including the identification area 13 and the bolt is bent sharply to about 90° just adjacent the nut 19 as shown in FIG. 3.

If a thief attempts to enter by removing the bolt seal, his first and most logical move would be to straighten the bolt 12 back to its original form and in so doing would break said bolt because of the work hardening which takes place due to the bending action. The nut 21 is very difficult to remove from the bolt after it has been broken because the threads in the bending area 12c will have been distorted and will bind. Also, the bolt cannot be held because the round head 11 would slip in a holding tool such as a pair of pliers. When the container reaches a destination or check point the fact that the end of the bolt 12b was broken from the bolt would immediately indicate that someone had attempted to breach the security of the seal. When the bolt is removed the identification of the seal would be given by the numbers 17 on the flat portion 16 of the bolt since this identification number and the one on the identification area 13 are the same numbers.

FIG. 4 illustrates a modification of the invention wherein the nut 21 is replaced by a spin nut 23. FIGS. 5, 6 and 7 are detail views of the spin nut which comprises an inner cylindrical member 26 formed with a shoulder 27 on one end into which a spring washer 28 is received and against which an inner threaded cylindrical member 31 is received within the central opening of the member 26. The inner opening 32 of the portion 31 is threaded. An outer cylindrical cover member 33 fits over the member 26 and has an outer shoulder 34 with a central opening through which the end of the bolt 12 extends as shown in FIG. 6. The cylindrical member 33 and cylindrical member 26 are joined by a press fit so that they form a unitary unit after assembly. The spin nut 23 can be threaded onto the bolt 12 as shown in FIG. 4 by rotating the cylindrical outer portion 33 until it engages hasp parts 18 and 19 tightly as shown in FIG. 4. Then the bending tool 22 is utilized to bend the end of the bolt 12 to the dotted position shown in FIG. 4 to complete the sealing operation. If an attempt is made to remove the seal by straightening, the bolt 12 will break in the region 12c adjacent the spin nut and the thief will not be able to remove the spin nut from the bolt. During an installation of a bolt seal having a right hand thread the lock washer 28 provides just enough friction between the shoulder of the inner shell 26 and the threaded portion 31 to overcome minor defects in the threaded portion of the bolt 12, because the right hand spiral of the lock washer 28 has its ends biting into the two said adjacent parts.

Contrarily, when the thief attempts to remove the spin nut, the friction is much less in that the ends of the lock washer 28 are now trailing with respect to the counter clockwise rotation of the outer shells, thereby causing slippage as soon as the threaded nut portion 31 encounters a defect in the threads of bolt 12, such as a burr or a distortion due to the bending of said bolt.

A further intention of the inventor is the utilization of left hand threaded bolts and spin nuts, so that a thief could spend all or a great deal of his time attempting to loosen a bolt seal, when in effect he will actually be tightening said seal, at least until he realized his error. Since time is of great essence to a thief, this may cause him to abandon the attempted break-in. As he attempts to rotate the spin nut, the inner cylindrical threaded portion 31 will remain stationary relative to the bolt 12 and the cylindrical member 26 and 33 will rotate relative to the member 31 thus preventing removal of the spin nut from the bolt 12.

A low carbon grade of steel e.i., 1008 to 1018 will not 'work harden', as readily during the manufacturing process or from bending as for example, 1020 to 1045. If one were to use a 1045 grade of steel the work hardening due to manufacture or bending is very great, hence, a choice must be made. If the carbon content is too great, the bolt will break before a 90° bend is acquired, thereby the identification portion of the bolt would be lost upon application. To conclude, the carbon content should be such that the initial 90° bend can be made as well as a partial straighten-attempt back toward the normal longitudinal axis of the bolt before bending. At some point, in this straightening attempt the bolt will crack off at the bend.

A zinc plating may be used to prevent corrosion of the identifying numbers on the tongue. Zinc plating will not cause surface embrittlement, which in turn will not cause breakage on the initial 90° bend.

Although the invention has been described with respect to preferred embodiments it is not to be so limited as changes and modifications may be made which are within the full intended scope as defined by the appended claims.

I claim as my invention:

1. A bolt seal comprising:

a bolt with a threaded portion having a head at one end and a flattened area at the other end on which an identification can be printed, a nut threadedly receivable on said threaded portion, wherein said nut is a spin nut which has a first cup-shaped cylindrical member with sides and a bottom at right angles to the sides and with a central opening through which said bolt is receivable, and a threaded member with a central threaded opening receivable into said cup-shaped member and rotatably attached to said cup-shaped cylindrical member, wherein said spin nut further includes a cover second cup-shaped cylindrical member with sides and a flat bottom at right angles to the sides and with a central opening through which said bolt is receivable and said cover member non-rotatably attached to said first cup-shaped cylindrical member and said threaded member rotatably confined between said first and second cup-shaped cylindrical members whereby said threaded member rotates when said spin nut is turned in a first direction but does not turn when said spin nut is turned in the other direction and also includes a second flattened area formed on said bolt near its head upon which an identification can be printed and said identification corresponding to the identification on the flattened area at said other end, and wherein said bolt is made of material that has a characteristic such that said threaded portion of said bolt does not break when bent 90° but which breaks when straightened to its initial position.

2. A bolt seal according to claim 1 wherein said bolt is made of steel which becomes work hardened when it is bent.

3. A bolt seal according to claim 1 including a spring washer mounted between said threaded member and said first cup-shaped cylindrical member.

4. A bolt seal according to claim 1 wherein said threaded portion and said nut have left hand threads.

* * * * *